US012580875B2

(12) United States Patent
Shetty et al.

(10) Patent No.: US 12,580,875 B2
(45) Date of Patent: Mar. 17, 2026

(54) METHODS AND SYSTEMS FOR EXCHANGING NETWORK PACKETS BETWEEN HOST AND MEMORY MODULE USING MULTIPLE QUEUES

(71) Applicant: SAMSUNG ELECTRONICS CO., LTD., Suwon-si (KR)

(72) Inventors: Nitesh Shetty, Bengaluru (IN); Rahul T R, Chickmagluru (IN); Jin In So, Hwaseong-si (KR); Jong-Geon Lee, Seoul (KR); Ravi Shankar Venkata Jonnalagadda, Hyderabad (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 776 days.

(21) Appl. No.: 17/863,062

(22) Filed: Jul. 12, 2022

(65) Prior Publication Data

US 2023/0012707 A1     Jan. 19, 2023

(30) Foreign Application Priority Data

Jul. 13, 2021     (IN) ............................ 202141031489

(51) Int. Cl.
*G06F 12/0855*     (2016.01)
*H04L 49/9047*     (2022.01)

(52) U.S. Cl.
CPC ...... *H04L 49/9047* (2013.01); *G06F 12/0855* (2013.01); *G06F 2212/1024* (2013.01); *G06F 2212/154* (2013.01)

(58) Field of Classification Search
CPC .............. H04L 49/9047; H04L 49/901; H04L 49/3036; G06F 12/0855; G06F 2212/1024; G06F 9/5061; G06F 13/1642
See application file for complete search history.

(56) References Cited

U.S. PATENT DOCUMENTS

| | | | |
|---|---|---|---|
| 9,762,491 B2 | 9/2017 | Gafni et al. | |
| 10,547,560 B1 | 1/2020 | Patel et al. | |
| 2009/0234908 A1* | 9/2009 | Reyhner ................. | G06F 9/546 |
| | | | 709/203 |
| 2011/0145514 A1* | 6/2011 | Lee ........................ | B60Q 5/006 |
| | | | 711/147 |
| 2015/0180805 A1* | 6/2015 | Yoshida .................. | G06F 21/85 |
| | | | 370/421 |
| 2022/0405017 A1* | 12/2022 | Yang ................... | G06F 12/0891 |

FOREIGN PATENT DOCUMENTS

CN           110661720 A        1/2020

OTHER PUBLICATIONS

Communication issued on Mar. 15, 2023 by the Indian Patent Office in Indian Patent Application No. 202141031489.

* cited by examiner

*Primary Examiner* — Charles J Choi
(74) *Attorney, Agent, or Firm* — Sughrue Mion, PLLC

(57)     ABSTRACT
A method and system for exchanging network packets in a memory system is provided. A size of each network packet to be transmitted is determined. Each network packets is segregated into one of plural queues based on the size of the network packet. Each network packet is transmitted over a shared memory, according to the queue in which the network packet is segregated.

18 Claims, 14 Drawing Sheets

Figure 4B:
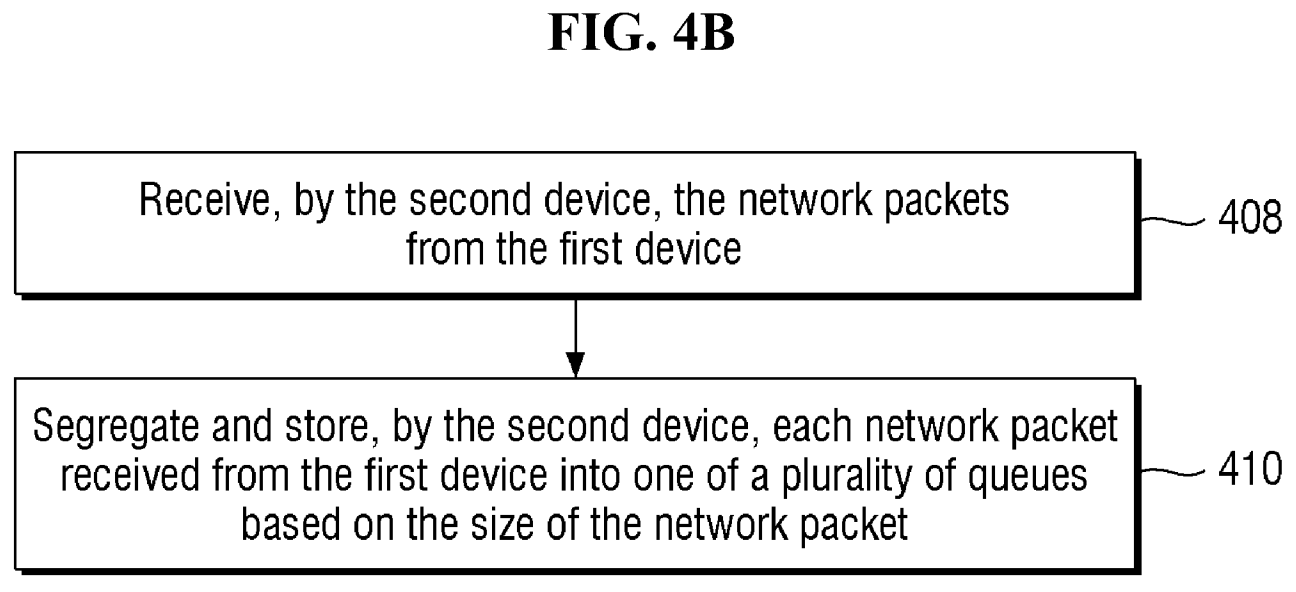

Receive, by the second device, the network packets from the first device
— 408

Segregate and store, by the second device, each network packet received from the first device into one of a plurality of queues based on the size of the network packet
— 410

Perform, by the first device, polling to check the arrival of the network packets in the respective plurality of queues — 502

Transmit, by the first device, the network packets within the first device based on the respective queues, on arrival of the network packets in the respective queues — 504

602 — Determine, by the host, the size of the network packets to be transmitted to the memory module 604 — Segregate, by the host, each of the network packets into one of the plurality of queues, based on the determined size of the network packet 606 — Transmit, by the host, the network packets to the memory module in the respective queues over the shared memory

702

Receive, by the host, the network packets from the memory module over the shard memory

704

Determine, by the host, the size of each of the network packets received from the memory module

706

Segregate and Store, by the host, each of the received network packets in the one of the plurality of queues, based on the determined size of the network packet

FIG. 8

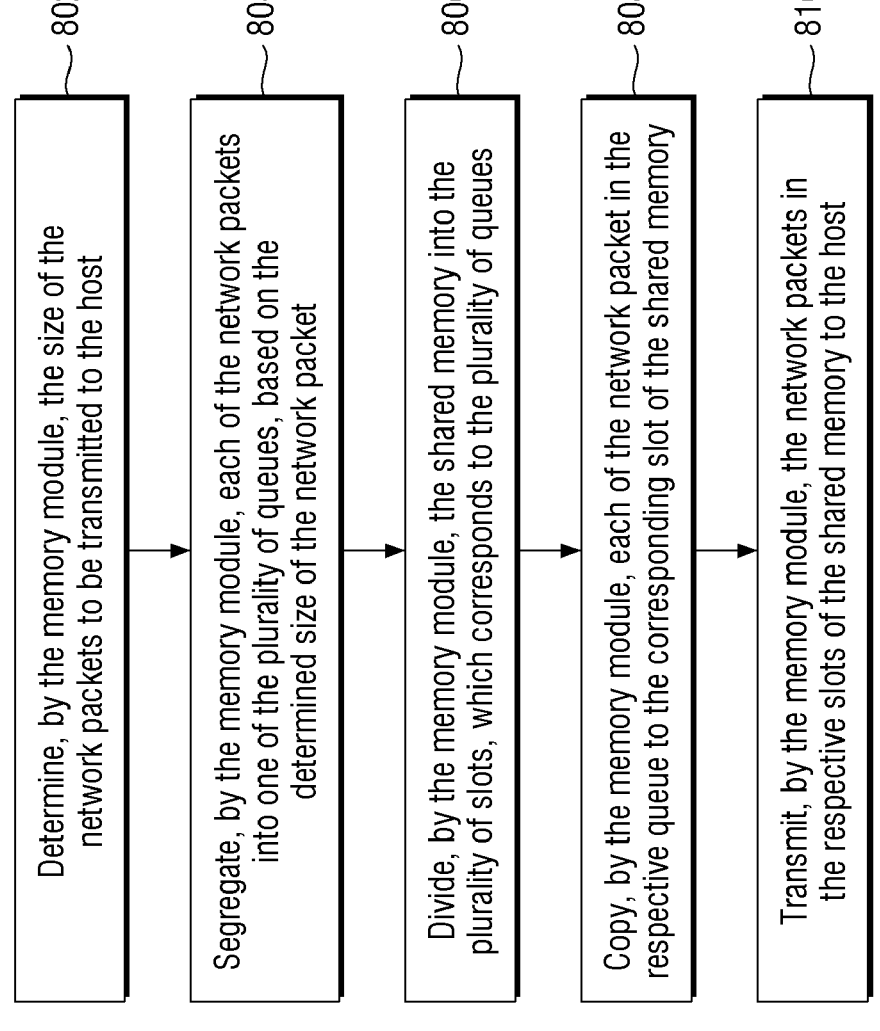

Determine, by the memory module, the size of the network packets to be transmitted to the host — 802

Segregate, by the memory module, each of the network packets into one of the plurality of queues, based on the determined size of the network packet — 804

Divide, by the memory module, the shared memory into the plurality of slots, which corresponds to the plurality of queues — 806

Copy, by the memory module, each of the network packet in the respective queue to the corresponding slot of the shared memory — 808

Transmit, by the memory module, the network packets in the respective slots of the shared memory to the host — 810

FIG. 9

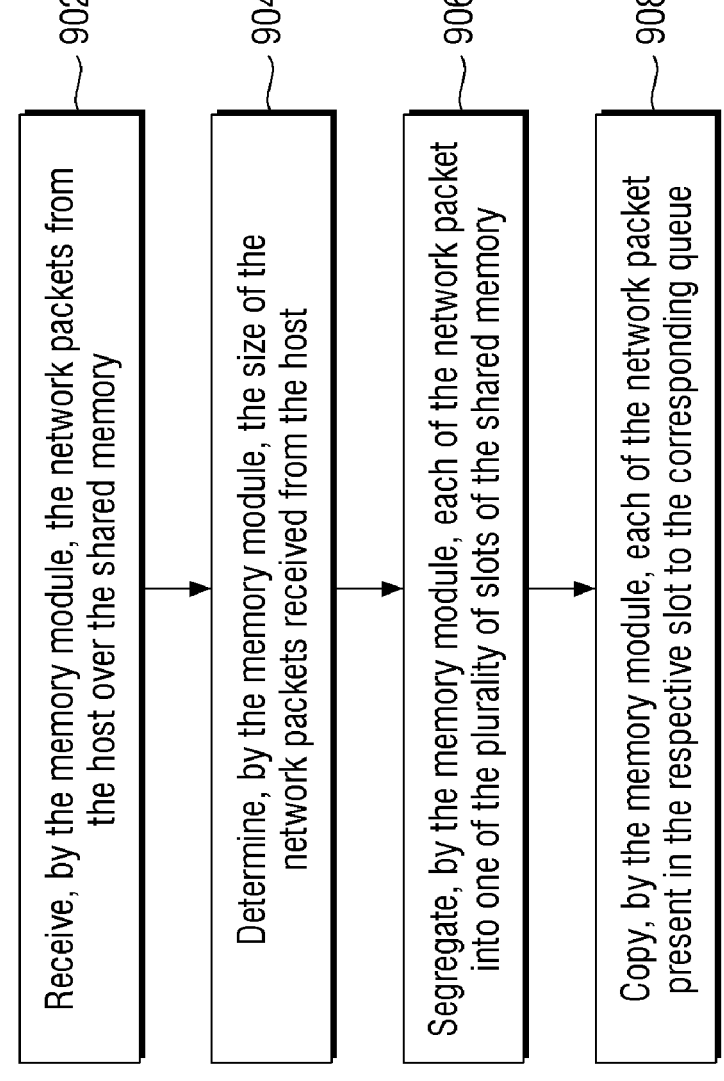

902 — Receive, by the memory module, the network packets from the host over the shared memory 904 — Determine, by the memory module, the size of the network packets received from the host 906 — Segregate, by the memory module, each of the network packet into one of the plurality of slots of the shared memory 908 — Copy, by the memory module, each of the network packet present in the respective slot to the corresponding queue

FIG. 10

| | Normal Queue | LQP/PQP Queue |
|---|---|---|
| Network BW | 13.1 Gbps | 20.7 Gbps |
| Latency | 0.145 ms | 0.064 ms |

METHODS AND SYSTEMS FOR EXCHANGING NETWORK PACKETS BETWEEN HOST AND MEMORY MODULE USING MULTIPLE QUEUES

CROSS REFERENCE TO RELATED APPLICATION

This Application claims priority from Indian Patent Application No. 202141031489 filed on Jul. 13, 2021, in the Indian Intellectual Property Office, the entire contents of which are herein incorporated by reference in their entirety.

BACKGROUND

The present disclosure relates to the field of memory modules and more particularly to exchanging network packets between a host and a memory module using multiple queues.

A memory module/device like a Network Dual In-Line Memory Module (NW-DIMM) may be used in fields of distributed computing, machine learning (ML), Artificial Intelligence (AI), data base acceleration, and so on. The NW-DIMM may be an application transparent implementation of a network processor connected over a low latency Double Data Rate (DDR) Interface (IF). The NW-DIMM includes a processing unit and a shared memory. The processing unit may be used as an Ethernet Physical layer to establish a network link between a host and the NW-DIMM. The shared memory may be used to exchange network packets with the host.

In the related art, while transmitting network packets of variable size, smaller network packets may be sandwiched between larger network packets. Thus, the smaller network packets have to wait for the completion of transmission of the larger network packets that have been scheduled before a generation of the smaller network packets, which in turn results in high latency for transmission of the smaller network packets.

In addition, because the smaller network packets have to wait for the completion of transmission of the larger packets, there may be stalling of acknowledgements which reduces bandwidth, as the subsequent network packets may not be generated until the acknowledgements have been received.

Thus, exchanging the network packets between the host and the NW-DIMM using the related art approaches may impact overall latency and bandwidth utilization of an interface (between the host and the NW-DIMM).

SUMMARY

According to an aspect of one or more embodiments, there is provided a method for exchanging at least one network packet between a first device and a second device in a memory system, the method comprising determining, by the first device, a size of each of the at least one network packet; segregating, by the first device, each of the at least one network packet into one of a plurality of queues based on the size of the network packet that is determined; and transmitting, by the first device, each network packet to the second device over a shared memory, according to a respective queue into which the network packet is segregated.

According to an aspect of one or more embodiments, there is provided a memory system comprising a first device; and a second device coupled to the first device over a shared memory, wherein the first device is configured to determine a size of each of at least one network packet; segregate each network packet into one of a plurality of queues based on the size of the network packet that is determined; and transmit each network packet to the second device over the shared memory, according to a respective queue into which the network packet is segregated.

According to another aspect of one or more embodiments, there is provided a memory module in a memory system, the memory module comprising a shared memory; and a memory driver coupled to the shared memory, wherein the memory driver is configured to determine a size of each of at least one network packet to be transmitted to a host; segregate each of the at least one network packet into one of a plurality of queues, based on the size of the network packet, the plurality of queues including a latency queue pair (LQP) and a performance queue pair (PQP); and transmit each network packet to the host over the shared memory according to a respective queue into which the network packet is segregated, wherein the memory module includes a Network Dual In-Line Memory Module.

BRIEF DESCRIPTION OF FIGURES

These and other aspects will be better appreciated and understood by description of various embodiments with reference to the drawings, in which:

FIGS. 4A and 4B are examples of flow diagrams depicting a method for exchanging network packets, according to various embodiments;

FIG. 8 is an example of a flow diagram depicting a method for transmitting the network packets, according to various embodiments;

FIG. 9 is an example of a flow diagram depicting a method for receiving the network packets, according to various embodiments; and FIG. 10 is an example table depicting a comparison of latency and bandwidth measured with respect to exchange of the network packets using the multiple queues according to various embodiment and using a normal queue of a related art approach.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein may be practiced and to further enable those of skill in the art to practice the example embodiments herein. Accordingly, this disclosure should not be construed as limiting the scope of the example embodiments herein.

In related art approaches, the Network Dual In-Line Memory Module (NW-DIMM) may use a circular buffer implemented in a shared memory to queue transmission (tx) and reception (rx) network packets, while transmitting the network packets to the host and receiving the network packets from the host, respectively. The tx and rx network packets may be queued based on a round robin/First-In-First-Out (FIFO) fashion. However, while transmitting network packets of variable size in the circular buffer, smaller network packets may be sandwiched between larger network packets. Thus, the smaller network packets have to wait for the completion of transmission of the larger network packets that have been scheduled before generation of the smaller network packets, which in turn results in high latency for transmission of the smaller network packets.

Figure 1:
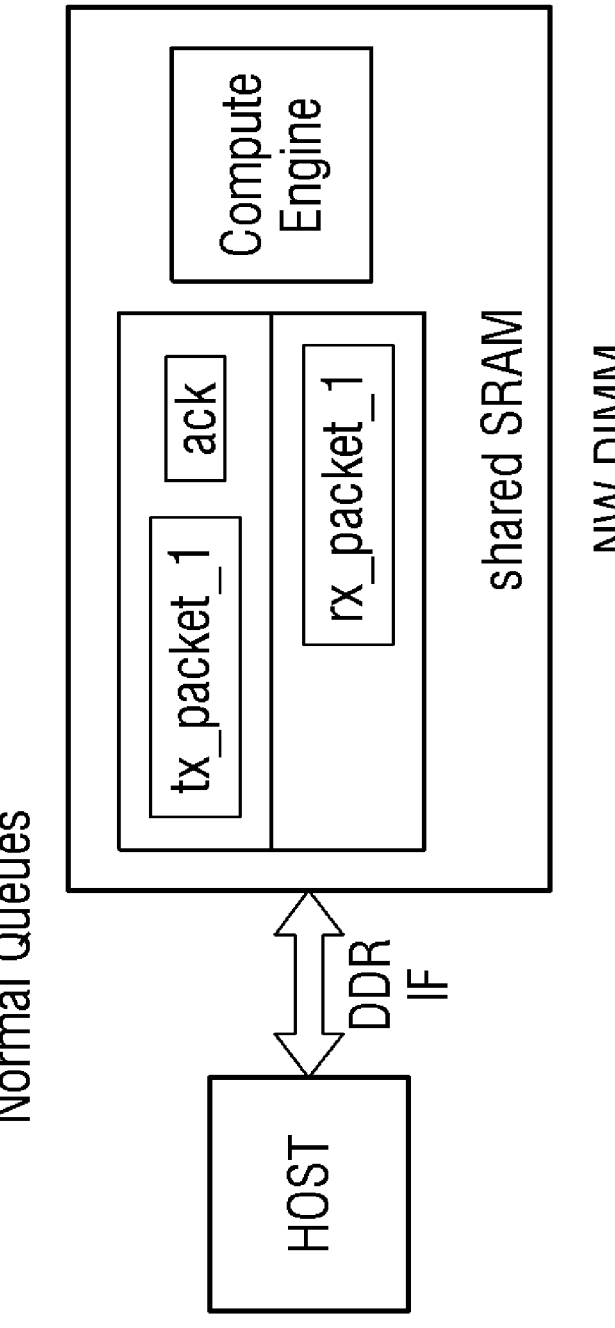
FIG. 1 depicts an example of a related art approach of exchanging network packets between a host and a memory module.

In addition, since the smaller network packets have to wait for the completion of transmission of the larger packets, there may be stalling of acknowledgements (as depicted in FIG. 1), which have to be exchanged between the NW-DIMM and the host for transmission and reception of each network packet. This stalling of acknowledgments reduces bandwidth, because the subsequent network packets may not be generated until the acknowledgements have been received.

Thus, exchanging the network packets between the host and the NW-DIMM using the related art approaches may impact overall latency and bandwidth utilization of an interface (between the host and the NW-DIMM).

It is an aspect to provide methods and systems for exchanging network packets between a host and a memory module using multiple queues.

It is another aspect to provide methods and systems for segregating each network packet into one of the multiple queues based on a size of each network packet and exchanging each network packet between the host and the memory module in the respective queue, wherein the multiple queues include a latency queue pair (LQP) and a performance queue pair (PQP).

It is yet another aspect to provide methods and systems for segregating and storing, on the host or the memory module, each received network packet into one of the multiple queues based on the size of each network packet.

It is yet another aspect to provide methods and systems for performing polling on each of the multiple queues to check arrival of at least one network packet for transmission or reception.

Methods and systems consistent with the present disclosure provide for exchanging network packets between a memory module and a host using multiple queues. The memory module may be a Network Dual In-Line (NW-DIMM).

Referring now to the drawings, and more particularly to FIGS. 2A through 10, where similar reference characters denote corresponding features consistently throughout the figures, there are shown example embodiments.

Figure 2A:
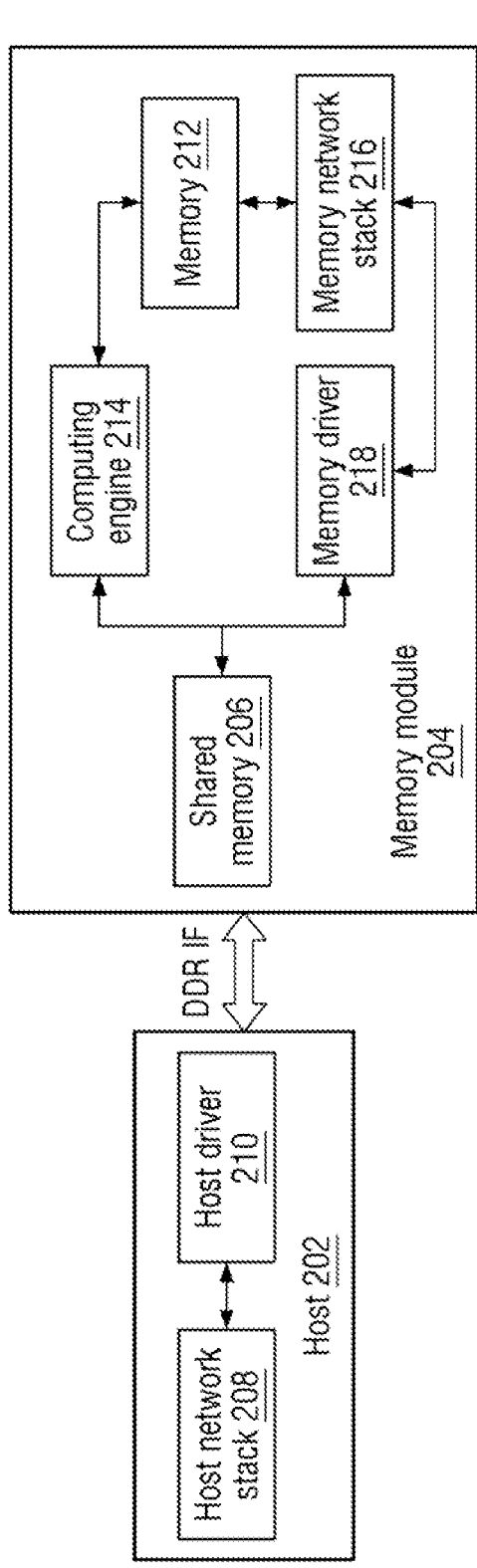
FIGS. 2A-2C depict an example of a memory system, according to various embodiments.
Figure 2B:
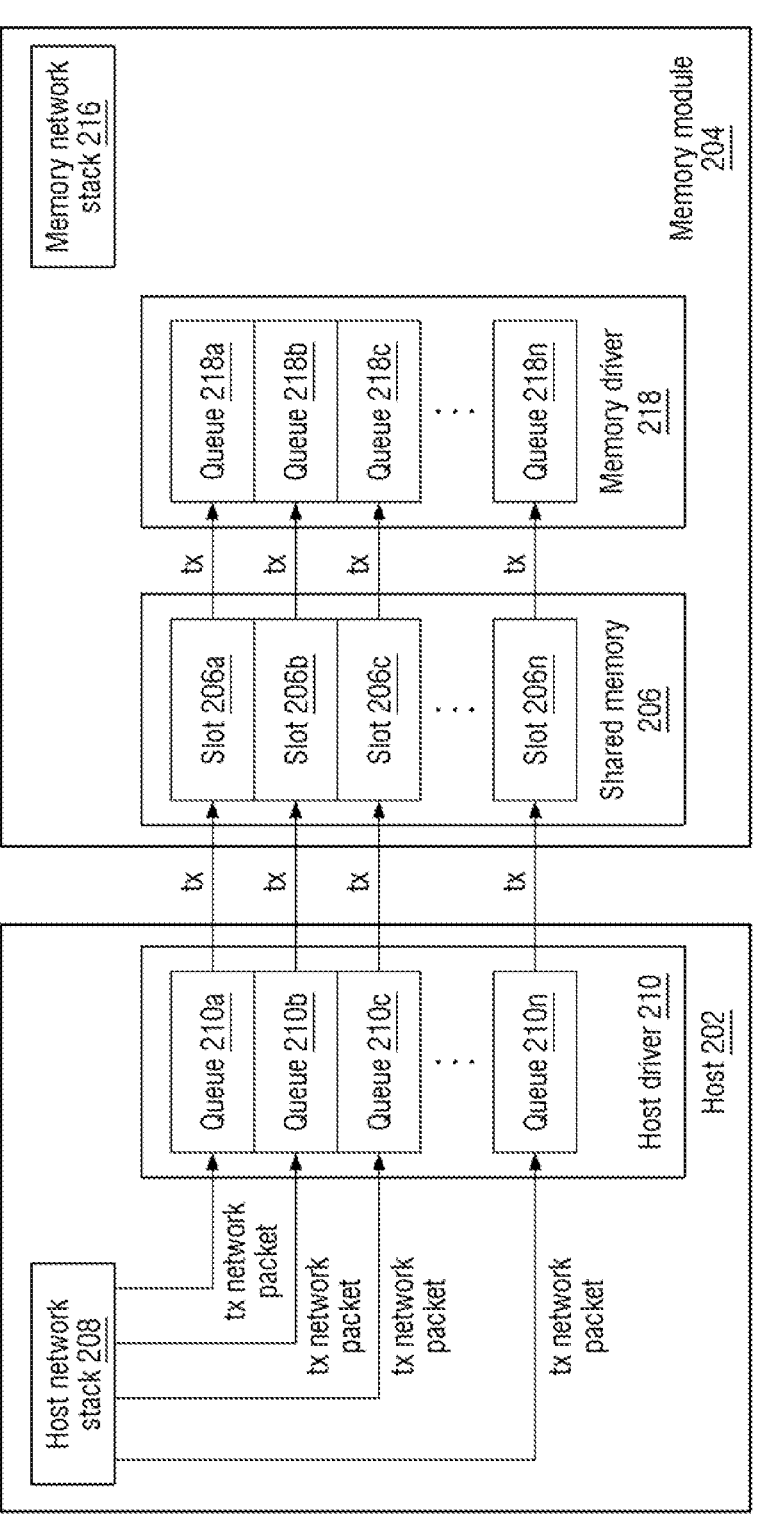
Figure 2C:
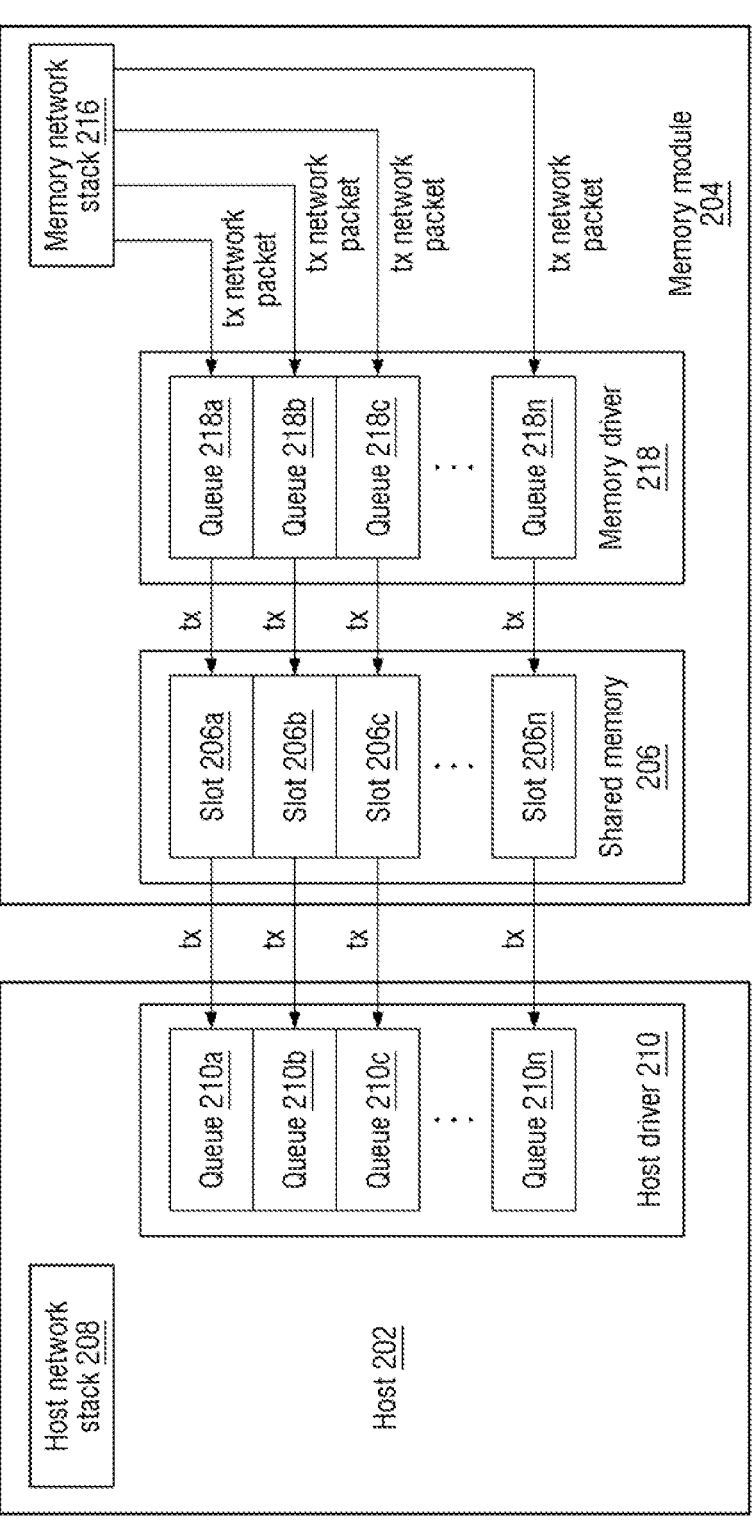

FIGS. 2A, 2B, and 2C depict a memory system, according to various embodiments.

As depicted in FIG. 2A, a memory system 200 includes a host 202, and a memory module 204.

Examples of the host 202 may be, but are not limited to, a server, a desktop computer, a hand-held device, a multi-processor system, a microprocessor based programmable consumer electronics, a laptop, a network computer, a minicomputer, a mainframe computer, and so on. The memory module 204 may be a memory device that includes a near-memory processing architecture. In some embodiments, the memory module 204 may be, but is not limited to, a Network Dual In-Line (NW-DIMM), or any other memory device that includes a near-memory processing architecture. The host 202 and the memory module 204 connect over a communication buffer/interface. In some embodiments, a shared memory 206 (of the memory module 204 as will be described further later) and a Dual Data Rate (DDR) interface (IF) both operate together as the communication buffer/interface. The DDR IF may be a low latency interface, as compared, for example, to Ethernet cards.

Various embodiments discussed herein use terms such as, "host", "first device", "second device", and so on, interchangeably to refer to a device that may support communication with the memory module 204. Various embodiments discussed herein use the terms such as "memory module", "first device", "second device", "client device", "target device", "NW-DIMM", and so on, interchangeably to refer to a memory device that includes a near-memory processing architecture.

The host 202 may include a host network stack 208 and a host driver 210.

The host network stack 208 may include application programs/computer instructions to operate the host 202. For example, in some embodiments, the application programs/computer instructions may be executed by one or more processors (e.g., one or more microprocessors) or one or more applications of the host 202 to operate the host 202. The host network stack 208 may interpret data to be transmitted to the memory module 204 and create one or more network packets including data to be transmitted to the memory module 204. The network packets may include control information and the data depending upon a network protocol supported by the host 202. The control information provides information such as, but are not limited to, a source network address, a destination network address, error detection codes, and so on. The data may be user data that includes at least one of media (for example: audio, video, images, or the like), text, files, and so on. In an example, the data may be stored in an internal memory of the host 202. In another example, the data may be data processed by one or more processors/applications of the host 202. The host network stack 208 may provide the network packets to the host driver 210 for transmission to the memory module 204 over the DDR IF and the shared memory 206. The host network stack 208 may also receive the network packets from the memory module 204 through the host driver 210 and perform one or more actions on the received network packets for further processing.

The host driver 210 may be translator circuitry that executes a host driver function (software/program instructions) to transmit the network packets to the memory module 204 and to receive the network packets from the memory module 204 over the DDR IF and the shared memory 206. In some embodiments, as depicted in FIGS. 2B and 2C, the host driver 210 may create and maintain a plurality of queues for storing the network packets. The plurality of queues may include queues 210a-210n. Examples of the plurality of queues may be, but are not limited to, a latency queue pair (LQP), a performance queue pair (PQP), and so on. For example, in some embodiments, the queue 210a may be a latency queue pair (LQP), and the queue 210b may be a performance queue pair (PQP), etc. In other embodiments, the queues 210a-210n may each be a LQP, or may each be a PQP. In still other embodiments, the number of the LQPs among the plurality of queues 210a-210n may be equal to the number of the PQPs among the plurality of queues 210a-210n, and in still other embodiments, the number of the LQPs among the plurality of queues 210a-210n may be less than or greater than the number of the PQPs among the plurality of queues 210a-210n. The plurality of queues 210a-210n may correspond to different types of circular buffers. For creating the plurality of queues 210a-210n, the host driver 210 may divide the shared memory 206 into a plurality of smaller (circular) buffers and assign each buffer as the queue. In an example, the host driver 210 may create the number of queues 210a-210n based on a user configurable "number of queues" parameter. That is, "n" may be a user configurable parameter. The user configurable "number of queues" parameter may be received from a user and may indicate a number of queues to be created for exchanging the network packets between the host 202 and the memory module 204. Also, the host driver 210 may maintain separate control registers for each queue. The control registers may provide information about an amount of buffer that has to be processed from the shared memory 206, to the host driver 210.

The plurality of queues 210a-210n may be used to store network packets of variable sizes. In an example, the LQP 210a may be used to store smaller network packets. The smaller network packets may be network packets of a size which is less than or equal to a set transmission packet size. In some embodiments, the set transmission packet size may be pre-defined. In an example, a typical Internet Control Message Protocol (ICMP) transfer may include the smaller network packets. In another example, the PQP 210b may be used to store larger network packets. The larger network packets may be the network packets of a size which is greater than the set transmission packet size. In an example, file transfer protocols (FTP) may include the larger network packets. It is understood that the host driver 210 may include any other types of queues (including those described above) at the same time.

In some embodiments, the host driver 210 may set the transmission packet size based on at least one of, but is not limited to, availability of the shared memory 206, a type of network packets/traffic to be exchanged with the memory module 204, and so on. The type of network traffic denotes the size of the network packets generated by the one or more applications of the host 202. In an example, the transmission packet size may be 1 Kilobyte (KB). In another example, the transmission packet size may be 10 KB.

As depicted in FIG. 2B, the host driver 210 may receive the one or more network packets from the host network stack 208 in order to transmit the one or more network packets to the memory module 204. On receiving the network packets, the host driver 210 may determine the size of each of the received network packets (using a network layer). Based on the size of each network packet, the host driver 210 may segregate and transfer each network packet into one of the plurality of queues 210a-210n. In an example, the host driver 210 may segregate and transfer the network packet into the LQP 210a, if the network packet is the smaller network packet. In an example, the host driver 210 may segregate and transfer the network packet into the PQP 210b, if the network packet is the larger network packet. The host driver 210 may transmit the network packets to the memory module 204 from the respective queues over the DDR IF and the shared memory 206 independently (i.e., simultaneously or in parallel). In an example, the transmission of the network packets in the LQP 210a may be faster compared to the other queues, because the LQP 210a includes the smaller network packets.

In some embodiments, the host driver 210 may use different types of copy commands to transmit the network packets associated with the different queues 210a-210n to the memory module 204 over the DDR IF and the shared memory 206. In an example, the host driver 210 may use a memory copy command to transmit the network packets to the memory module 204 over the DDR IF and the shared memory 206, which have been associated with the LQP 210a. Transmitting the network packets to the memory module 204 using the memory copy command refers to copying of the network packets from the host 202 to the memory module 204 using a suitable component (for example: a Central Processing Unit (CPU), microprocessor, etc.) of the host 202. The memory copy command may be a blocking call command, which may not be executed again until the current transmission of the network packets is complete. In another example, the host driver 210 may use a Direct Memory Access (DMA) command to transmit the network packets to the memory module 204 over the DDR IF and the shared memory 206, which have been associated with the PQP 210b. Transmitting the network packets to the memory module 204 using the DMA command refers to copying of the network packets from the host 202 to the memory module 204 using a dedicated hardware that uses the interface bandwidth efficiently.

As depicted in FIG. 2C, the host driver 210 may also receive the network packets transmitted from the memory module 204 over the DDR IF and the shared memory 206. On receiving the network packets from the shared memory 206, the host driver 210 may determine the size of each of the network packets. The host driver 210 may segregate and store each of the network packets into one of the plurality of queues 210a-210n, based on the determined size of the network packet. The host driver 210 may provide the stored network packets to the host network stack 208 for further processing.

Returning to FIG. 2A, the memory module 204 may include a memory 212, the shared memory 206, a computing engine 214, a memory network stack 216, and a memory driver 218. In some embodiments, the memory driver 218 may be a slave driver.

The memory 212 may be accessible by the computing engine 214 of the memory module 204. The shared memory 206 may be accessible by the computing engine 214 of the memory module 204 and the host 202. Each of the memory 212 and the shared memory 206 may include at least one of, but is not limited to, a Double Data Rate (DDR) memory, a synchronous random access memory (SRAM), and so on. Examples of the DDR memory may be, but are not limited to, a DDR synchronous dynamic random access memory (DDR SDRAM), a DDR version/type 3 (DDR3), a DDR version four (DDR4), a low power DDR4 (LPDDR4), a graphics DDR version five (gDDR5), a high bandwidth memory (HBM), or any other DDR memory, which may be adopted for future memory technologies.

The memory 212 may be used for storing the data and regularly accessing the data. The shared memory 206 may be a reserved memory in the system memory, which acts as the communication buffer/interface between the memory module 204 and the host 202. The shared memory 206 may be exposed to both the host 202 and the memory module 204, as a part of a host memory space and a memory module physical memory space. The DDR IF and the shared memory 206 together operate as a memory channel interface. The shared memory 206 may be used to exchange the network packets between the memory module 204 and the host 202. The network packets may include the control information and the data stored in the memory 212. Embodiments herein use the terms such as, "shared memory", "SRAM", "memory channel interface", and so on, interchangeably to refer to a communication buffer/interface used to exchange the network packets between the host 202 and the memory module 204.

The computing engine 214 may include one or a plurality of processors. The one or the plurality of processors may include at least one of, but is not limited to, a general purpose processor, a Central Processing Unit (CPU), an application processor (AP), a graphic processing unit (GPU), a visual processing unit (VPU), a neural processing unit (NPU), a digital signal processor, or an image signal processor (ISP), and so on. The computing engine 214 may be configured to access the data from the memory 212 using local memory channels (which have been isolated from global memory channels shared with other memory modules) and to process the accessed data.

The memory network stack 216 may include application programs/computer instructions to operate the memory module 204. That is, in some embodiments, the application programs/computer instructions may be accessed and executed by the computing engine 214 to operate the memory module 204. The memory network stack 216 may interpret the data (i.e., stored in the memory 212) to be transmitted to the host 202 and create the network packets including the data to be transmitted to the host 202. The memory network stack 216 may provide the network packets to the memory driver 218 for transmission to the host 202 over the DDR IF and the shared memory 206. The memory network stack 216 may also receive the data from the host 202 through the memory driver 218 and perform one or more actions on the received data for further processing.

The memory driver 218 may be translator circuitry that executes software/program instructions to transmit the network packets to the host 202 and receive the network packets from the host 202 over the shared memory 206. In some embodiments, the memory driver 210 may be translator circuitry that executes a slave driver function. In an embodiment, as depicted in FIGS. 2B, and 2C, the memory driver 218 may create and maintain a plurality of queues for storing the network packets. The plurality of queues may include queues 218a-218n. Examples of the plurality of queues 218a-218n may be, but are not limited to, the LQP, the PQP, and so on. For example, in some embodiments, the queue 218a may be the LQP, and the queue 218b may be the PQP, etc. In other embodiments, the queues 218a-218n may each be a LQP, or may each be a PQP. In still other embodiments, a number of LQPs among the plurality of queues 218a-218n may be equal to a number of the PQPs among the plurality of queues 218a-218n, and in still other embodiments, a number of LQPs among the plurality of queues 218a-218n may be less than or greater than a number of the PQPs among the plurality of queues 218a-218n. The plurality of queues 218a-218n may correspond to the different types of circular buffers. The plurality of queues 218a-218n may be used to store the network packets of variable sizes. In an example, the LQP 218a may be used to store the smaller network packets. In another example, the PQP 218b may be used to store the larger network packets. It is understood that the memory driver 218 may include any other types of queues (including those described above) at the same time. The memory driver 218 may create control registers for each of the plurality of queues 218a-218n. The control registers may provide information about an amount of buffer that has to be processed from the shared memory 206, to the memory driver 218.

The memory driver 218 may create and maintain the plurality of queues similar to the host driver 210, and thus a repeated description thereof is omitted for conciseness.

As depicted in FIG. 2C, the memory driver 218 may receive the one or more network packets from the memory network stack 216 in order to transmit the one or more network packets to the host 202. On receiving the network packets, the memory driver 218 may determine the size of each of the received network packets. The memory driver 218 may segregate and transfer each network packet into one of the plurality of queues 218a-218n, by comparing the determined size of each network packet with a set transmission packet size. In some embodiments, the transmission packet size may be pre-defined. In some embodiments, the memory driver 218 may set the transmission packet size based on at least one of, but is not limited to, availability of the shared memory 206, a type of network packets/traffic (i.e., the size of the network packets) to be exchanged with the host 202, and so on. In an example, the memory driver 218 may segregate and transfer the network packet into the LQP 218a, if a size of the network packet is less than the set transmission packet size (i.e., the smaller network packet). In an example, the memory driver 218 may segregate and transfer the network packet into the PQP 218b, if a size of the network packet is greater than the set transmission packet size (i.e., the larger network packet). The memory driver 218 may transmit the network packets to the shared memory 206 in the respective queues independently.

In some embodiments, the memory driver 218 may use different types of copy commands to transmit the network packets associated with the different queues 218a-218n to the shared memory 206. In an example, the memory driver 218 may use the memory copy command to transmit the network packets to the shared memory 206, which have been associated with the LQP 218a. In another example, the memory driver 218 may use the DMA command to transmit the network packets to the shared memory 206, which have been associated with the PQP 218b. Transmitting the network packets to the shared memory 206 using the memory copy command refers to copying of the network packets received from the memory network stack 216 into the shared memory 206 using a suitable component (for example: a Central Processing Unit (CPU), a microprocessor, etc.) of the memory module 204. The memory copy command may be a blocking call command, which may not be executed again until the current transmission of the network packets is complete. Transmitting the network packets to the shared memory 206 using the DMA command refers to copying of the network packets received from the memory network stack 216 into the shared memory 206 using a dedicated hardware that uses the interface bandwidth efficiently.

In an embodiment, as depicted in FIGS. 2B and 2C, the shared memory 206 may divide a memory space into a plurality of slots 206a-206n and maintain the plurality of slots 206a-206n for storing the network packets of different sizes. In an example, the shared memory 206 may create the number of slots 206a-206n based on a user configurable number of slots parameter. The user configurable number of slots parameter may be received from the user, the parameter indicating a number of slots to be created for exchanging the network packets between the host 202 and the memory module 204. The plurality of slots 206a-206n may correspond to the plurality of queues maintained by the memory driver 218. In an example, the shared memory 206 may maintain a slot 206a corresponding to the LQP 218a of the memory driver 218 and store the smaller network packets in the slot 206a. In another example, the shared memory may maintain a slot 206b corresponding to the PQP 218b of the memory driver 218 and store the larger network packets in the slot 206b. The size of the slot 206a corresponding to the LQP 218a may be small, compared to the size of the slot 206b corresponding to the PQP 218b, because the size of the network packet transmitted in the LQP 218a is small compared to the PQP 218b.

As depicted in FIG. 2C, on receiving the network packets from the memory driver 218 in the respective queues, the shared memory 206 may copy each of the network packets received from the memory driver 218 into one of the slots 206a-206n that correspond to the queue associated with the network packet. In an example, the shared memory 206 may copy the network packet received from the memory driver 218 into the slot 206a if the received network packet is associated with the LQP 218a. In another example, the shared memory 206 copies the network packet received from the memory driver 218 into the slot 206b if the received network packet is associated with the PQP 218b. The shared memory 206 may transmit the network packets to the host driver 210 of the host 202 in the respective slots 206a-206b independently.

In an embodiment, the shared memory 206 may use different types of copy commands to transmit the network packets associated with the different queues 218a-218n/slots 206a-206n to the host 202. In an example, the shared memory 206 may use the memory copy command to transmit the network packets to the host 202, which have been associated with the LQP 218a/slot 206a. In another example, the shared memory 206 may use the DMA command to transmit the network packets to the host 202, which have been associated with the PQP 218b/slot 206b.

As depicted in FIG. 2B, the shared memory 206 may also receive the network packets transmitted from the host driver 210 of the host 202. On receiving the network packets from the host driver 210, the shared memory 206 may determine the size of each of the received network packets. The shared memory 206 may copy each of the received network packets into one of the slots 206a-206n, based on the determined size of the received network packet. In an example, the shared memory 206 may copy the received network packets into the slot 206a corresponding to the LQP 218a, if the received network packets are the smaller packets. In another example, the shared memory 206 may copy the received network packets into the slot 206b corresponding to the PQP 218b, if the received network packets are the larger packets. The shared memory 206 may forward the received network packets in the respective slots 206a-206b, to the memory driver 218.

The memory driver 218 may store each of the network packets received from the shared memory 206 in one of the queues, based on the slot associated with the network packet. In an example, the memory driver 218 may store the network packets in the LQP 218a, if the network packets have been associated with the slot 206a (that is corresponding to the LQP). In another example, the memory driver 218 may store the network packets in the PQP 218b, if the network packets have been associated with the slot 206b (that is corresponding to the PQP).

Embodiments enable the host driver 210 and the memory driver 218 to perform a polling on each of the maintained plurality of queues. The host driver 210 and the memory driver 218 may perform the polling to check arrival of the one or more network packets for transmission and reception. In an example, the host driver 210 and the memory driver 218 may perform the polling on the respectively maintained plurality of queues by reading the control registers associated with the respective plurality of queues at a regular interval of time. In another example, the host driver 210 and the memory driver 218 may perform the polling on the respectively maintained plurality of queues, on triggering a separate tasklet by a high resolution timer. The separate tasklet indicates to the host driver 210 and the memory driver 218 to perform the polling on the respectively maintained plurality of queues.

In an embodiment, the host driver 210 and the memory driver 218 may perform a low frequency polling on the LQP 210a and the LQP 218a, respectively. In another embodiment, the host driver 210 and the memory driver 218 may perform a high frequency polling on the PQP 210b and the PQP 218b, respectively.

Embodiments enable the host driver 210 and the memory driver 218 to exchange acknowledgments between each other, on exchanging the network packets with each other through the respective queues.

Thus, exchanging the network packets between the host 202 and the memory module 204 in the memory system 200 using the multiple queues for the different sizes of the network packets may reduce network latency and improve network bandwidth of the memory module 204.

FIGS. 2A-2C show exemplary components of the memory system 200, but it is to be understood that other embodiments are not limited to these components. In other embodiments, the memory system 200 may include fewer or more than the number of components depicted in FIGS. 2A-2C. Further, the labels or names of the components are used only for illustrative purposes and do not limit the scope of the embodiments. In other embodiments, one or more components may be combined together to perform same or substantially similar function in the memory system 200.

Figure 3A:
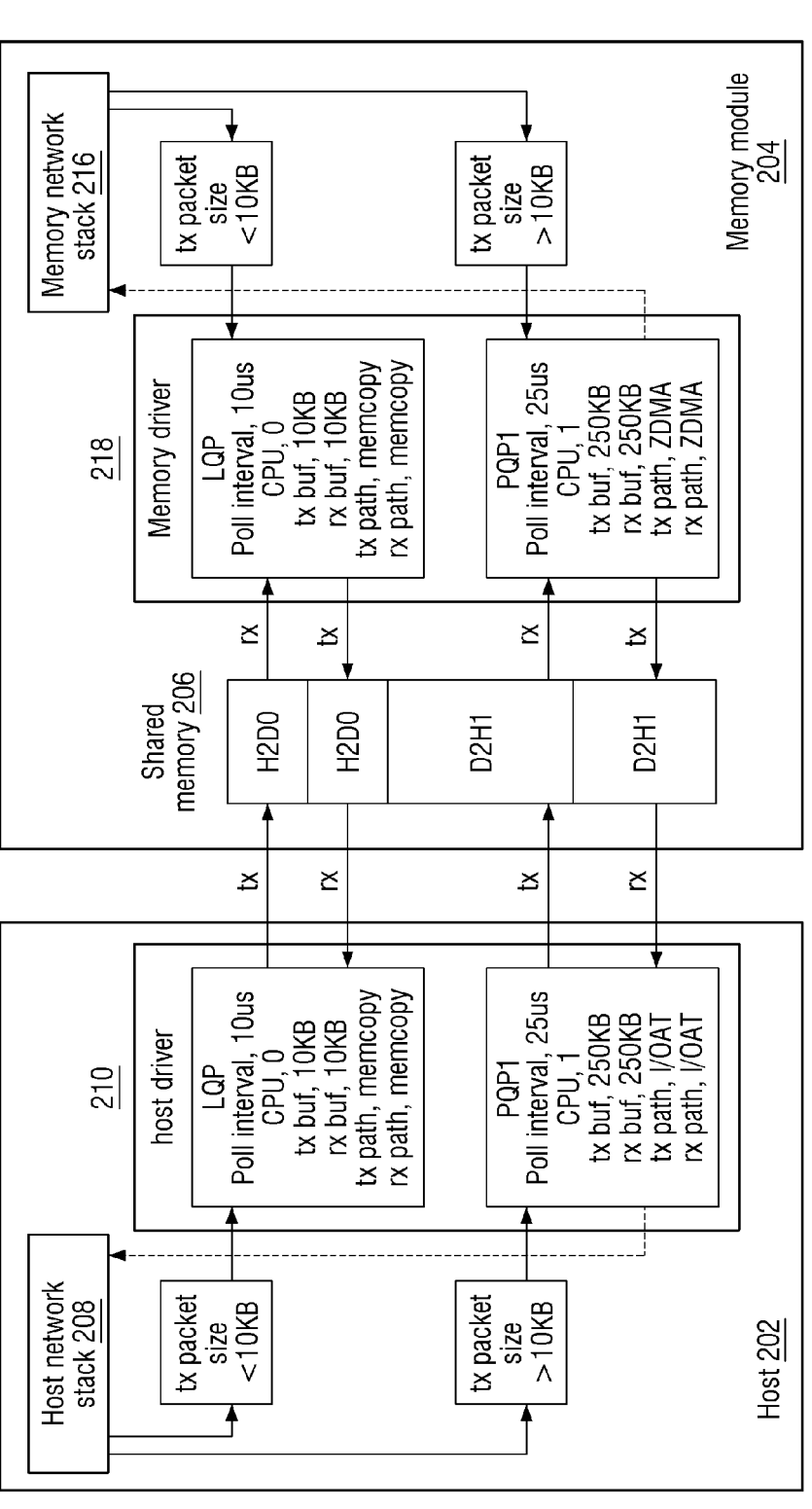
FIGS. 3A and 3B depict an example of a memory system, according to various embodiments.
Figure 3B:
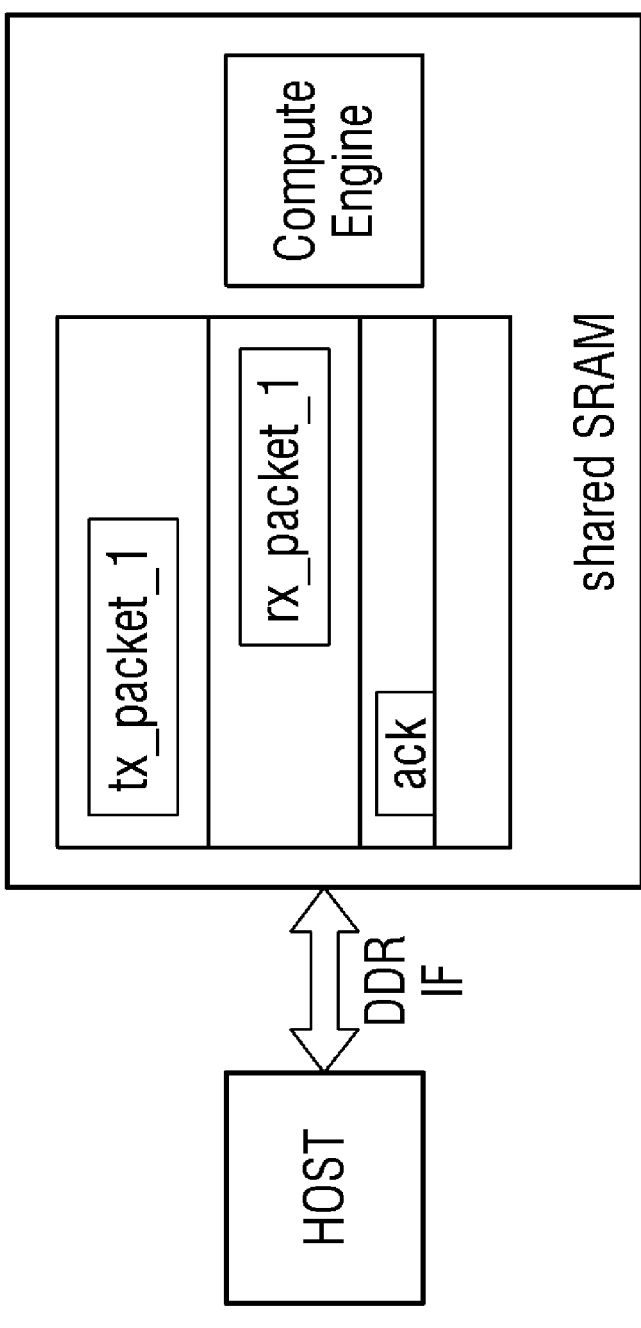

FIGS. 3A and 3B depict an example of a memory system, according to various embodiments. A memory system 200, wherein network packets are exchanged between the host 202 and the memory module 204 using the plurality of queues and acknowledgments are exchanged between the host 202 and the memory module 204 after transmission and reception of each packet will be discussed with reference to FIGS. 3A and 3B.

Embodiments herein explain the exchanging of the network packets between the host 202 and the memory module 204, by considering that the host driver 210 and the memory driver 218 include the LQP queue and the PQP queue, as an example, but it may be understood by a person skilled in the art that host driver 210 and the memory driver 218 may include multiple different queues including the LQP and the PQP for the different sizes of the network packets.

An example flow of transmitting the network packets from the host 202 to the memory module 204 using the multiple queues is further described. The host network stack 208 provides two network packets (a network packet A, a network packet B) to the host driver 210, which are to be transmitted to the memory module 204. On receiving the network packets from the host network stack 208, the host driver 210 determines the size of the network packet A as 10 KB and the size of the network packet B as 250 KB. The host driver 210 segregates and stores the network packet A in the LQP 210a, since the size of the network packet A is lesser than or equal to the set transmission packet size (i.e., for example; 10 KB). The host driver 210 segregates and stores the network packet B in the PQP 210*b*, since the size of the network packet B is greater than the set transmission packet size.

The host driver 210 further performs the polling on the LQP 210*a* and the PQP 210*b* to check the arrival of the network packets, which have to be transmitted to the memory module 204. The host driver 210 performs the low frequency polling on the LQP, for example for every 10 microseconds (μs), to check the arrival of the network packets in the LQP 210*a*. The memory driver 218 performs the high frequency polling on the PQP 210*b*, for example for every 25 μs, to check the arrival of the network packets in the PQP 210*b*.

Since the network packet A has arrived in the LQP 210*a*, the host driver 210 transmits the network packet A to the shared memory 206 of the memory module 204 in the respective LQP 210*a*, using the memory copy command. Since the network packet B has arrived in the PQP 210*b*, the host driver 210 transmits the network packet B to the shared memory 206 of the memory module 204 in the respective PQP 210*b*, using the DMA command. The host 210 transmits the network packet A and the network packet B to the shared memory 206 in the respective queues independently. In other words, a timing of the transmission of the network packet A does not depend on a timing of the transmission of the network packet B, and vice versa. The network packet A in the LQP 210*a* may reach the shared memory 206 faster compared to the network packet B in the PQP 210*b*, since the LQP 210*a* is associated with the smaller network packet and the low frequency polling.

On receiving the network packet A from the host 202, the shared memory 206 determines the size of the network packet A. The shared memory 206 copies the network packet A in the slot 206*a*, for example; a H2D0 slot, since the size of the network packet A is lesser than or equal to the set transmission size. The slot 206*a*/H2D0 may correspond to the LQP 218*a* and may be of size of the network packet A (e.g., 10 KB). On receiving the network packet B from the host 202, the shared memory 206 determines the size of the network packet B. The shared memory 206 copies the network packet B in the slot 206*b*, for example; a D2H1 slot, since the size of the network packet B is greater than the set transmission size. The slot 206*b*/D2H1 may correspond to the PQP 218*b* and may be of size of the network packet B (e.g., 250 KB).

The shared memory 206 transmits the network packet A from the slot 206*a*/H2D0 to the LQP 218*a* of the memory driver 218 for storage. The shared memory 206 transmits the network packet B from the slot 206*b*/D2H1 to the PQP 218*b* of the memory driver 218 for storage.

An example flow of transmitting the network packets from the memory module 204 to the host 202 using the multiple queues is further described. The memory network stack 216 provides two network packets (a network packet A, a network packet B) to the memory driver 218, which have to be transmitted to the host 202. On receiving the network packets from the memory network stack 216, the memory driver 218 determines the size of the network packet A as 10 KB and the size of the network packet B as 250 KB. The memory driver 218 segregates and stores the network packet A in the LQP 218*a*, since the size of the network packet A is lesser than or equal to the set transmission packet size (i.e., for example; 10 KB). The memory driver 218 segregates and stores the network packet B in the PQP 218*b*, since the size of the network packet B is greater than the set transmission packet size.

The memory driver 218 further performs the polling on the LQP 218*a* and the PQP 218*b* to check the arrival of the network packets, which are to be transmitted to the host 202. The memory driver 218 performs the low frequency polling on the LQP, for example for every 10 μs, to check the arrival of the network packets in the LQP 218*a*. The memory driver 218 performs the high frequency polling on the PQP 218*b*, for example for every 25 μs, to check the arrival of the network packets in the PQP 218*b*.

Since the network packet A has arrived in the LQP 218*a*, the memory driver 218 transmits the network packet A to the slot 206*a*, for example: a H2D1, using the memory copy command, wherein the slot 206*a*/H2D0 may correspond to the LQP 218*a* and may be of size of the network packet A (e.g., 10 KB). Since the network packet B has arrived in the PQP 218*b*, the memory driver 218 transmits the network packet B to the slot 206*b*, for example: a D2H1, using the DMA command, wherein the slot 206*b*/D2H1 may correspond to the PQP 218*b* and may be of size of the network packet B (e.g., 250 KB). The memory driver 218 transmits the network packet A and the network packet B to the shared memory 206 in the respective queues independently. In other words, a timing of the transmission of the network packet A does not depend on a timing of the transmission of the network packet B, and vice versa. The network packet A in the LQP 218*a* may reach the shared memory 206 faster compared to the network packet B in the PQP 218*b*, since the LQP 218*a* is associated with the smaller network packet and the low frequency polling.

The shared memory 206 transmits the network packet A to the host driver 210 of the host 202 in the respective slot 206*a*/LQP using the memory copy command. The shared memory 206 transmits the network packet B to the host driver 210 of the host 202 in the respective slot 206*b*/PQP using the DMA command. The shared memory 206 transmits the network packet A and the network packet B to the host driver 210 of the host 202 in the respective slots independently. The network packet A present in the slot 206*a* corresponding to LQP 218*a* may reach the host driver 210 faster compared to the network packet B present in the slot 206*b* corresponding to the PQP 218*b*, since the slot 206*a* corresponding to the LQP 218*a* is associated with the smaller network packet.

On receiving the network packet A from the shared memory 206, the host driver 210 segregates and stores the network packet A in the LQP 210*a*, since the size of the network packet A is less than or equal to the set transmission packet size. On receiving the network packet B from the shared memory 206, the host driver 210 segregates and stores the network packet B in the PQP 210*b*, since the size of the network packet B is greater than the set transmission packet size.

Thus, the network packets of variable sizes may be exchanged between the memory module 204 and the host 202 using the separate multiple queues, which reduces the network latency and the improves the network bandwidth.

Embodiments enable the host driver 210 and the memory driver 218 to exchange acknowledgments (which may be generated using the network layer) between each other, on exchanging the network packets with each other through the respective queues, as depicted in FIG. 3B. Since the transmission of the smaller network packets are independent of the larger network packets, there may be no stalling of acknowledgments, thus improving the bandwidth and reducing latency of the memory system 200.

Figure 4A:
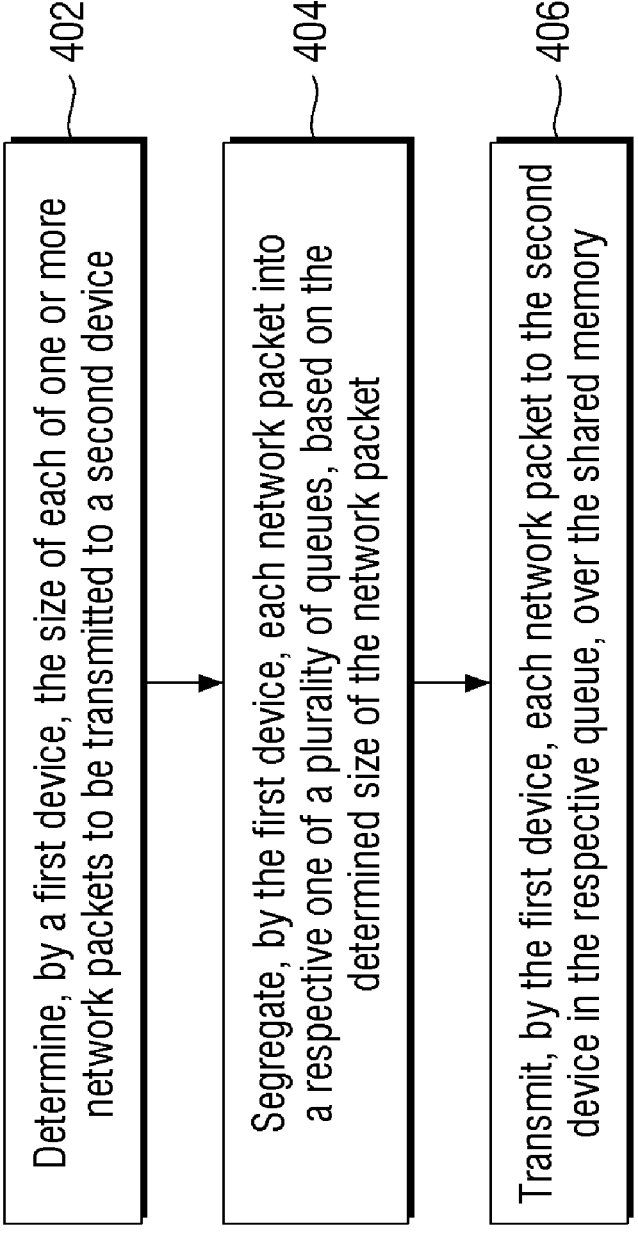

FIGS. 4A and 4B are examples of flow diagrams depicting a method for exchanging network packets, according to various embodiments. FIGS. 4A and 4B depict a method for exchanging the network packets between a first device and a second device using the plurality of queues, according to various embodiments. The first device and the second device may be the host 202 and the memory module 204, respectively, or vice-versa. In an embodiment, the memory module 204 may be the NW-DIMM.

As depicted in FIG. 4A, at step 402, the method includes determining, by the first device, the size of each of one or more network packets to be transmitted to the second device.

At step 404, the method includes segregating, by the first device, each network packet into a respective one of the plurality of queues, based on the determined size of the network packet. In an example, the plurality of queues may include at least one of, but is not limited to, the LQP, the PQP, and so on.

At step 406, the method includes transmitting, by the first device, each network packet to the second device in the respective queue, over the shared memory 206. The various actions, acts, blocks, steps, or the like in the method and the flow diagram of FIG. 4A may be performed in the order presented, in a different order or simultaneously. Furthermore, in some embodiments, some of the actions, acts, blocks, steps, or the like may be omitted, added, modified, skipped, or the like without departing from the scope of the embodiment.

As depicted in FIG. 4B, at step 408, the method includes receiving, by the second device, the network packets from the first device.

At step 410, the method includes segregating and storing, by the second device, each received network packet into one of the plurality of queues, based on the size of the network packet. The various actions, acts, blocks, steps, or the like in the method and the flow diagram of FIG. 4B may be performed in the order presented, in a different order or simultaneously. Furthermore, in some embodiments, some of the actions, acts, blocks, steps, or the like may be omitted, added, modified, skipped, or the like without departing from the scope of the embodiment.

Figure 5:
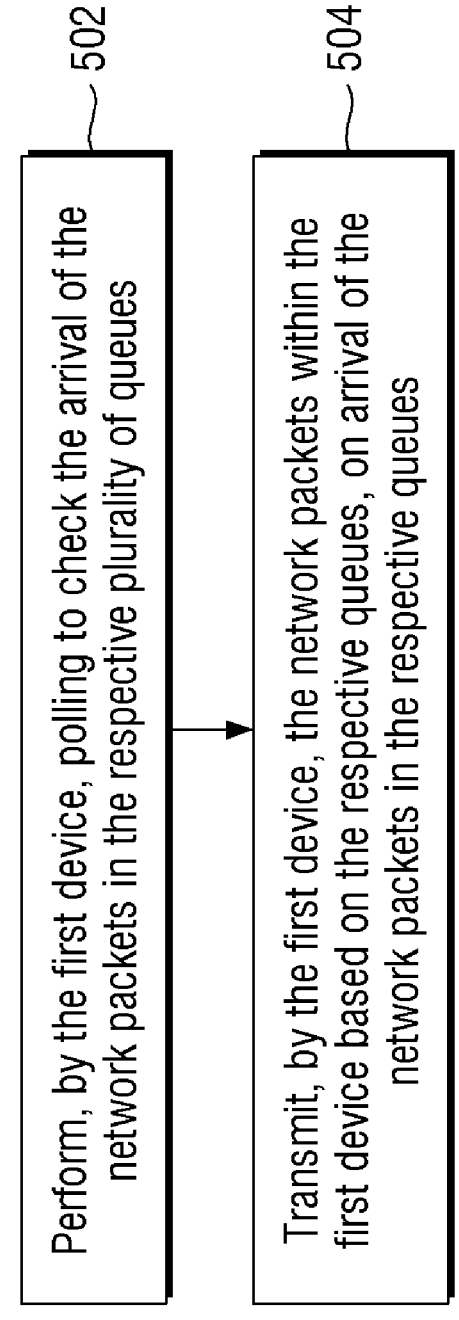
FIG. 5 is an example of a flow diagram depicting a method for performing a polling to exchange network packets, according to various embodiments.

FIG. 5 is an example of a flow diagram depicting a method for performing a polling to exchange network packets, according to various embodiments. FIG. 5 depicts a method for performing polling to exchange the network packets between the first device and the second device, according to embodiments. The first device and the second device may be the host 202 and the memory module 204 respectively, or vice-versa.

At step 502, the method includes performing, by the first device, polling to check the arrival of the network packets in the respective plurality of queues. In an example, the first device may perform low frequency polling (for example; for every 10 μs) on the LQP and high frequency polling (for example; for every 25 μs) on the PQP.

At step 504, the method includes transmitting, by the first device, the network packets within the first device based on the respective queues, on the arrival of the network packets in the respective queues. The various actions, acts, blocks, steps, or the like in the method and the flow diagram of FIG. 5 may be performed in the order presented, in a different order or simultaneously. Furthermore, in some embodiments, some of the actions, acts, blocks, steps, or the like may be omitted, added, modified, skipped, or the like without departing from the scope of the embodiment.

Figure 6:
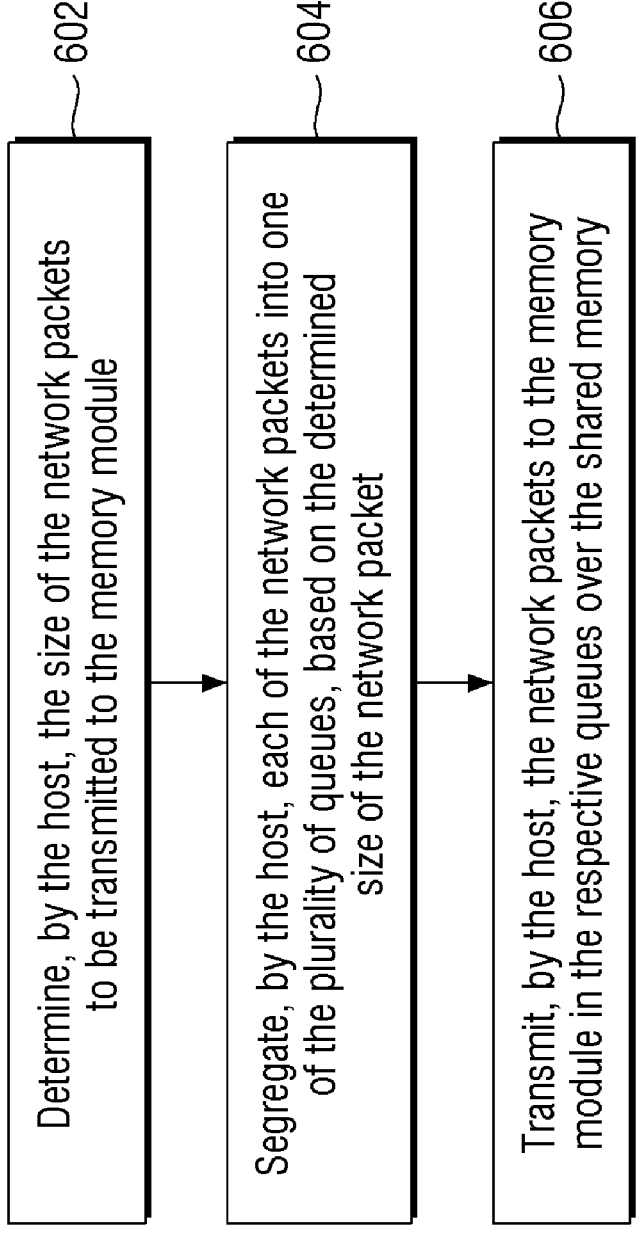
FIG. 6 is an example of a flow diagram depicting a method for transmitting the network packets, according to various embodiments.

FIG. 6 is an example of a flow diagram depicting a method for transmitting the network packets, according to various embodiments. FIG. 6 depicts a method for transmitting the network packets from the host 202 to the memory module 204, according to embodiments.

At step 602, the method includes determining, by the host 202, the size of the network packets to be transmitted to the memory module 204. In an example, the host 202 determines the network packets are the smaller packets, if the size of the network packets is less than or equal to the set transmission packet size. In another example, the host 202 determines the network packets are the larger packets, if the size of the network packets is greater than the set transmission packet size.

At step 604, the method includes segregating, by the host 202, each of the network packets into one of the plurality of queues 210a-210n, based on the determined size of the network packet. In an example, the host 202 segregates the network packets into the LQP 210a, if the network packets are the smaller packets. In another example, the host 202 segregates the network packets into the PQP 210b, if the network packets are the larger packets.

At step 606, the method includes transmitting, by the host 202, the network packets to the memory module 204 in the respective queues 210a-210n over the shared memory 206. The various actions, acts, blocks, steps, or the like in the method and the flow diagram of FIG. 6 may be performed in the order presented, in a different order or simultaneously. Furthermore, in some embodiments, some of the actions, acts, blocks, steps, or the like may be omitted, added, modified, skipped, or the like without departing from the scope of the embodiment.

Figure 7:
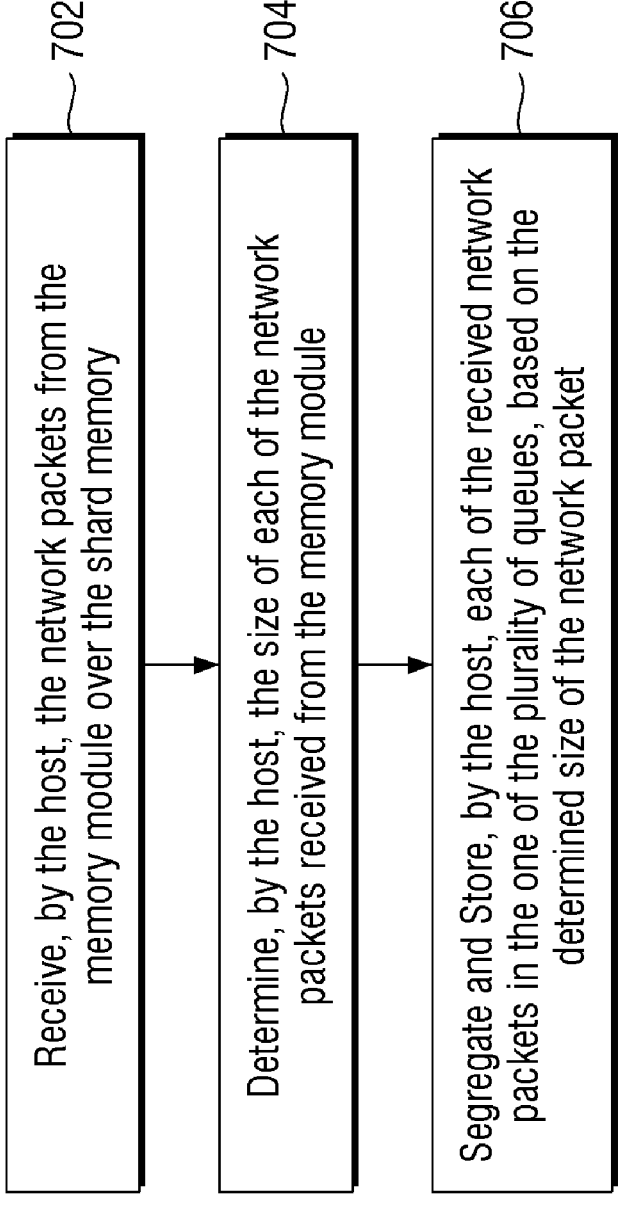
FIG. 7 is an example of a flow diagram depicting a method for receiving the network packets, according to various embodiments.

FIG. 7 is an example of a flow diagram depicting a method for receiving the network packets, according to various embodiments. FIG. 7 depicts a method for receiving the network packets by the host 202 from the memory module 204, according to embodiments.

At step 702, the method includes receiving, by the host 202, the network packets from the memory module 204 over the shared memory 206.

At step 704, the method includes determining, by the host 202, the size of each of the network packets received from the memory module 204.

At step 706, the method includes segregating and storing, by the host 202, each of the received network packets in the one of the plurality of queues, based on the determined size of the network packet. In an example, the host 202 segregates and stores the received network packets in the LQP 210a, if the received network packets are the smaller network packets. In another example, the host 202 segregates and stores the received network packets in the PQP 210b, if the received network packets are the larger network packets. The various actions, acts, blocks, steps, or the like in the method and the flow diagram of FIG. 7 may be performed in the order presented, in a different order or simultaneously. Furthermore, in some embodiments, some of the actions, acts, blocks, steps, or the like may be omitted, added, modified, skipped, or the like without departing from the scope of the embodiment.

FIG. 8 is an example of a flow diagram depicting a method for transmitting the network packets, according to various embodiments. FIG. 8 depicts a method for transmitting the network packets from the memory module 204 to the host 202, according to embodiments.

At step 802, the method includes determining, by the memory module 204, the size of the network packets to be transmitted to the host 202. In an example herein, the memory module 204 determines the network packets are the smaller packets, if the size of the network packets is less than or equal to the set transmission packet size. In another example herein, the memory module 204 determines the network packets are the larger packets, if the size of the network packets is greater than the set transmission packet size.

At step 804, the method includes segregating, by the memory module 204, each of the network packets into one of the plurality of queues 218*a*-218*n*, based on the determined size of the network packet. In an example, the memory module 204 segregates the network packets into the LQP 218*a*, if the network packets are the smaller packets. In another example, the memory module 204 segregates the network packets into the PQP 218*b*, if the network packets are the larger packets.

At step 806, the method includes dividing, by the memory module 204, the shared memory 206 into the plurality of slots 206*a*-206*b*, which corresponds to the plurality of queues 218*a*-218*n*.

At step 808, the method includes copying, by the memory module 204, each of the network packets in the respective queue to the corresponding slot of the shared memory 206. In an example, the memory module 204 copies the network packets present in the LQP 218*a* to the slot 206*a* that corresponds to the LQP 218*a*. In another example herein, the memory module 204 copies the network packets in the PQP 218*b* to the slot 206*b* that corresponds to the PQP 218*b*.

At step 810, the method includes transmitting, by the memory module 204, the network packets in the respective slots 206*a*-206*n* of the shared memory 206 to the host 202. The various actions, acts, blocks, steps, or the like in the method and the flow diagram of FIG. 8 may be performed in the order presented, in a different order or simultaneously. Furthermore, in some embodiments, some of the actions, acts, blocks, steps, or the like may be omitted, added, modified, skipped, or the like without departing from the scope of the embodiment.

FIG. 9 is an example of a flow diagram depicting a method for receiving the network packets, according to various embodiments. FIG. 9 depicts a method for receiving the network packets by the memory module 204 from the host 202, according to embodiments.

At step 902, the method includes receiving, by the memory module 204, the network packets from the host 202 over the shared memory 206. At step 904, the method includes determining, by the memory module 204, the size of the network packets received from the host 202.

At step 906, the method includes segregating, by the memory module 204, each of the network packets into one of the plurality of slots of the shared memory 206. At step 908, the method includes copying, by the memory module 204, each of the network packets present in the respective slot to the corresponding queue 218*a*-218*n*. In an example, the memory module 204 copies the network packets present in the slot 206*a* that corresponds to the LQP 218*a* to the LQP 218*a*. In another example, the memory module 204 copies the network packets present in the slot 206*b* that corresponds to the PQP 218*b* to the PQP 218*b*. The various actions, acts, blocks, steps, or the like in the method and the flow diagram of FIG. 9 may be performed in the order presented, in a different order or simultaneously. Furthermore, in some embodiments, some of the actions, acts, blocks, steps, or the like may be omitted, added, modified, skipped, or the like without departing from the scope of the embodiment.

FIG. 10 is an example table depicting a comparison of latency and bandwidth measured with respect to exchange of the network packets using the multiple queues according to various embodiment and using a normal queue of a related art approach. FIG. 10 depicts the latency and the bandwidth measured with respect to exchange of the network packets between the host 202 and the memory module 204 using the multiple queues (the LQP/PQP) according to various embodiments, and using a normal queue of a related art approach. Various embodiments described herein enable exchange of the network packets between the host 202 and the memory module 204 using the multiple queues, which reduces the latency and increases the bandwidth compared to the related art approach, as depicted in FIG. 10.

Various embodiments described herein manage exchanging of network packets between a host and a memory module using multiple queues, wherein the multiple queues are maintained separately for the network packets of different sizes. Various embodiments described herein form the network queues (LQP/PQP) and the associated parameters, such as memory copy/DMA, polling interval/interrupt, shared buffer allocation, and so on. Various embodiments described herein decide the network queues (LQP/PQP) for the network packets, based on the network packets size in a layer (a driver) below a network (Transmission Control Protocol (TCP)/Internet Protocol (IP)) layer. Thus, various embodiments described herein:

provide best performance (best latency and bandwidth) for smaller/medium/larger network packets by preventing splitting of network packets;

address a problem of starvation as well as latency and throughput;

efficiently use a DMA command for transmitting the larger network packets, efficiently use a memory command for transmitting the smaller network packets, by focusing on fine tuning parameters for latency; and optimize usage of a shared memory between the host and memory module.

Various embodiments described herein enable existing applications and network frameworks such as Hadoop/ REDIS to execute on top of the queues without any modifications and reap the benefit of better latency and performance offered by the implementation of the queues in lower layers.

The various embodiments described herein may be implemented through at least one software program running on at least one hardware device and performing network management functions to control the elements. The elements shown in FIGS. 2A-3B may be at least one hardware device, or a combination of hardware devices and software modules.

The various embodiments described herein relate to methods and systems for exchanging network packets between a host and a memory module using multiple queues. Therefore, it is understood that the scope of the protection is extended to such a program and in addition to a computer readable medium having a message therein, such computer readable storage medium containing program code for implementation of one or more steps of the methods, when the program code runs on a server or mobile device or any suitable programmable device. The method is implemented in an embodiment through or together with a software program written in e.g. Very high speed integrated circuit Hardware Description Language (VHDL) or another programming language, or implemented by one or more VHDL or several software modules being executed on at least one hardware device. The hardware device may be any kind of portable device that may be programmed. The device may also include e.g. hardware such as e.g. an Application Specific Integrated Circuit (ASIC), or a combination of hardware and software, e.g. an ASIC and an FPGA, or at least one microprocessor and at least one memory with software modules located therein. The method embodiments described herein may be implemented partly in hardware and partly in software. Alternatively, the present disclosure may be implemented on different hardware devices, e.g. using a plurality of CPUs.

The foregoing description of the specific embodiments will fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the aspects herein have been described in terms of embodiments, those skilled in the art will recognize that the embodiments herein may be practiced with modification within the spirit and scope of the appended claims.

What is claimed is:

1. A method for exchanging at least one network packet between a first device and a second device in a memory system, the method comprising:
   determining, by the first device, a size of each of the at least one network packet;
   segregating, by the first device, each of the at least one network packet into one of a first plurality of queues at the first device, based on the size of the network packet that is determined;
   transmitting, by the first device, each network packet to the second device over a shared memory, according to a respective queue into which the network packet is segregated, and
   segregating and storing, by the second device, each network packet received from the first device into one of a second plurality of queues at the second device based on the size of the network packet.

2. The method of claim 1, wherein the first device and the second device are a host and a memory module respectively, or are the memory module and the host respectively, and
   wherein the memory module includes a Network Dual In-Line Memory Module.

3. The method of claim 1, wherein the first plurality of queues includes a latency queue pair (LQP) and a performance queue pair (PQP), and
   wherein the LQP and the PQP are different types of circular buffers.

4. The method of claim 3, wherein the first device creates the first plurality of queues by:
   dividing the shared memory into a plurality of circular buffers, based on a user configurable parameter indicating a number of the first plurality of queues to be created; and
   assigning one of the plurality of circular buffers as one of the first plurality of queues,
   wherein control registers are maintained for each of the first plurality of queues.

5. The method of claim 1, wherein the at least one network packet comprises a plurality of network packets, and the segregating, by the first device, each of the at least one network packet into the one of the first plurality of queues at the first device comprises:
   segregating a network packet of the plurality of network packets into a latency queue pair (LQP), if the network packet is a smaller network packet having a size less than or equal to a transmission packet size that is set based on at least one of an availability of the shared memory and a type of the network packet; and
   segregating a network packet of the plurality of network packets into a performance queue pair (PQP), if the network packet is a larger network packet having a size greater than the transmission packet size.

6. The method of claim 1, wherein the first device is a memory module and the second device is a host, and the transmitting includes:
   dividing the shared memory into a plurality of slots, each slot corresponding to one of the first plurality of queues; and
   copying each network packet from the first plurality of queues to a corresponding slot of the shared memory, wherein the shared memory transmits each network packet from a respective slot to the host.

7. The method of claim 6, wherein the copying comprises:
   using a memory copy command to transmit the network packet from the shared memory to the host, if a queue associated with the network packet is a latency queue pair (LQP); and
   using a Direct Memory Access (DMA) command to transmit the network packet from the shared memory to the host, if a queue associated with the network packet is a performance queue pair (PQP).

8. The method of claim 1, wherein the first device is a host, and the second device is a memory module, and
   the segregating and storing, by the second device, comprises:
   copying each network packet received from the host into one of a plurality of slots of the shared memory, based on the size of the network packet; and
   transferring the network packet from the respective one of the plurality of slots to a corresponding queue of the second plurality of queues for storing.

9. The method of claim 8, wherein a network packet received from the host is copied into a slot of the plurality of slots of the shared memory corresponding to a latency queue pair (LQP), if the network packet is a smaller network packet having a size less than or equal to a transmission packet size that is set based on at least one of an availability of the shared memory and a type of the network packet; and
   a network packet received from the host is copied into a slot of the plurality of slots of the shared memory corresponding to a performance queue pair (PQP), if the network packet is a larger packet having a size greater than the transmission packet size.

10. The method of claim 1, further comprising:
   performing, respectively by the first device and the second device, polling on each of the first plurality of queues and each of the second plurality of queues to check an arrival of at least one network packet for transmission or reception,
   wherein the polling is performed by reading control registers associated with corresponding ones of the first plurality of queues and the second plurality of queues at a regular interval, or by identifying a tasklet triggered by a timer maintained by the first device and the second device and reading the control registers at a time identified by the tasklet.

11. The method of claim 10, wherein a low frequency polling is performed on a queue, if the queue is a latency queue pair (LQP); and
   a high frequency polling is performed on a queue, if the queue is a performance queue pair (PQP).

12. A memory system comprising:
   a first device; and a second device coupled to the first device over a shared memory, wherein the first device is configured to:

determine a size of each of at least one network packet;

segregate each network packet into one of a first plurality of queues at the first device, based on the size of the network packet that is determined; and transmit each network packet to the second device over the shared memory, according to a respective queue into which the network packet is segregated, and wherein the second device is configured to:

segregate and store each network packet received from the first device into one of a second plurality of queues based on the size of the network packet.

13. The memory system of claim 12, wherein the first device and the second device are a host and a memory module respectively, or are the memory module and the host respectively, and wherein the memory module includes a Network Dual In-Line Memory Module.

14. The memory system of claim 12, wherein the plurality of queues includes a latency queue pair (LQP) and a performance queue pair (PQP), and wherein the LQP and the PQP are different types of circular buffers.

15. A memory module in a memory system, the memory module comprising:

a shared memory; and a memory driver coupled to the shared memory, wherein the memory driver is configured to:

determine a size of each of at least one network packet to be transmitted to a host;

segregate each of the at least one network packet into one of a plurality of queues at the memory driver, based on the size of the network packet, the plurality of queues including a latency queue pair (LQP) and a performance queue pair (PQP); and transmit each network packet to the host over the shared memory according to a respective queue into which the network packet is segregated, wherein the memory module includes a Network Dual In-Line Memory Module, and wherein the LOP and the PQP are different types of circular buffers.

16. The memory module of claim 15, wherein the memory driver is further configured to:

segregate a network packet into the LQP, if the network packet is a smaller network packet having a size less than or equal to a set transmission packet size; and segregate a network packet into the PQP, if the network packet is a larger network packet having a size greater than the set transmission packet size.

17. The memory module of claim 15, wherein the memory driver is further configured to:

divide the shared memory into a plurality of slots, each slot corresponding to one of the plurality of queues; and copy each network packet of a queue of the plurality of queues to a corresponding slot of the shared memory, wherein the shared memory transmits each network packet to the host in the respective slot, wherein a memory copy command is used to transmit the network packet from the shared memory to the host, if a queue associated with the network packet is the LQP; and a Direct Memory Access (DMA) command is used to transmit the network packet from the shared memory to the host, if a queue associated with the network packet is the PQP.

18. The memory module of claim 15, wherein the memory driver is further configured to receive and store the at least one network packet from the host by:

copying each network packet received from the host into one of a plurality of slots of the shared memory, based on the size of the network packet; and transferring the network packet of the respective one of the plurality of slots to a corresponding queue of the plurality of queues for storing, wherein a network packet received from the host is copied into a slot corresponding to the LQP, if the network packet is a smaller network packet having a size less than or equal to a set transmission packet size, and a network packet received from the host is copied into a slot corresponding to the PQP, if the network packet is a larger packet having a size greater than the set transmission packet size.

\* \* \* \* \*